Aug. 12, 1969     M. A. PROVI ET AL     3,460,642
LOW PROFILE BATHROOM SCALES
Filed April 28, 1967     6 Sheets-Sheet 1

Inventors
MIKE A. PROVI & S. ROBERT GUINTER
By Andrew F. Winterconn
Attorney

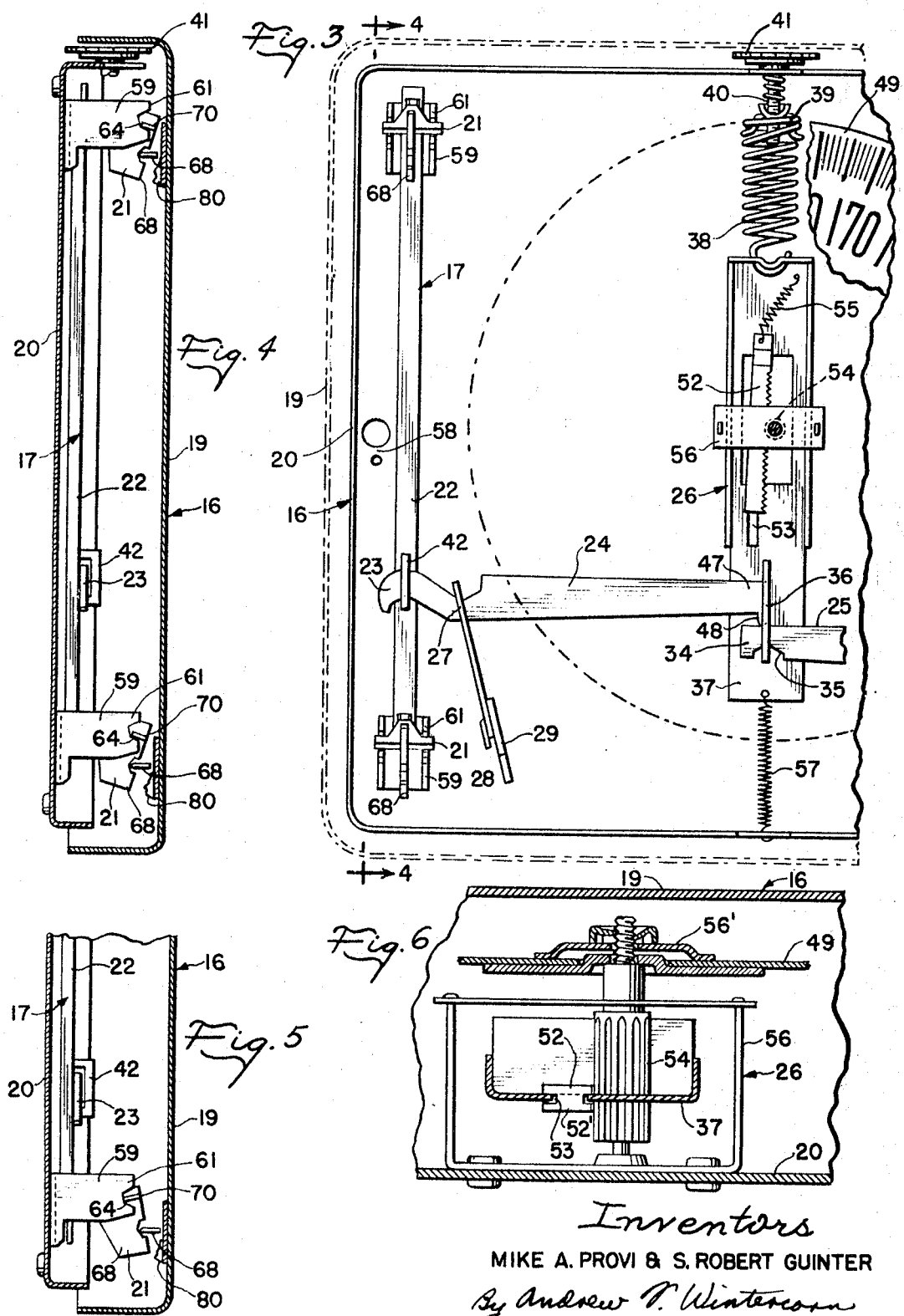

Aug. 12, 1969 — M. A. PROVI ET AL — 3,460,642
LOW PROFILE BATHROOM SCALES
Filed April 28, 1967 — 6 Sheets-Sheet 3
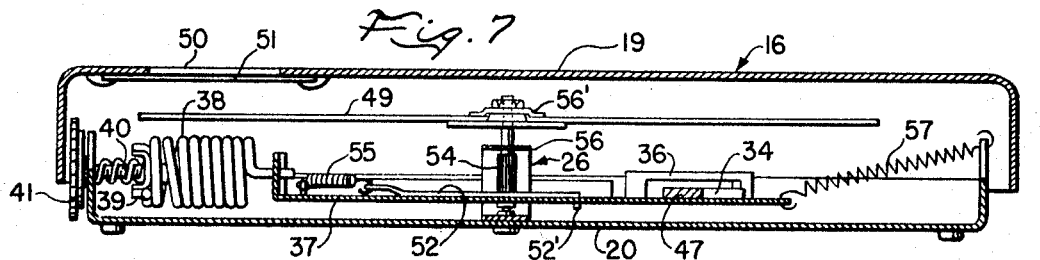
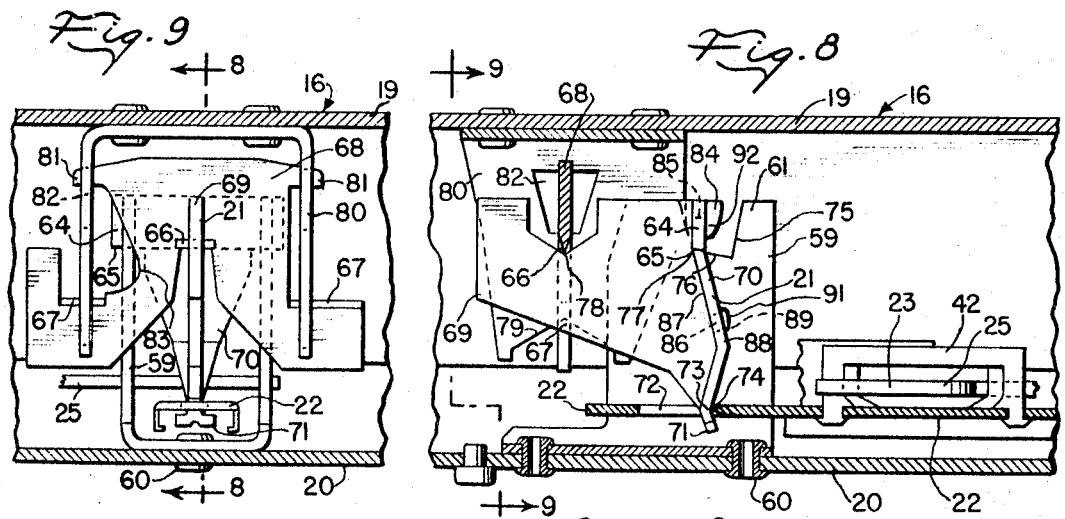
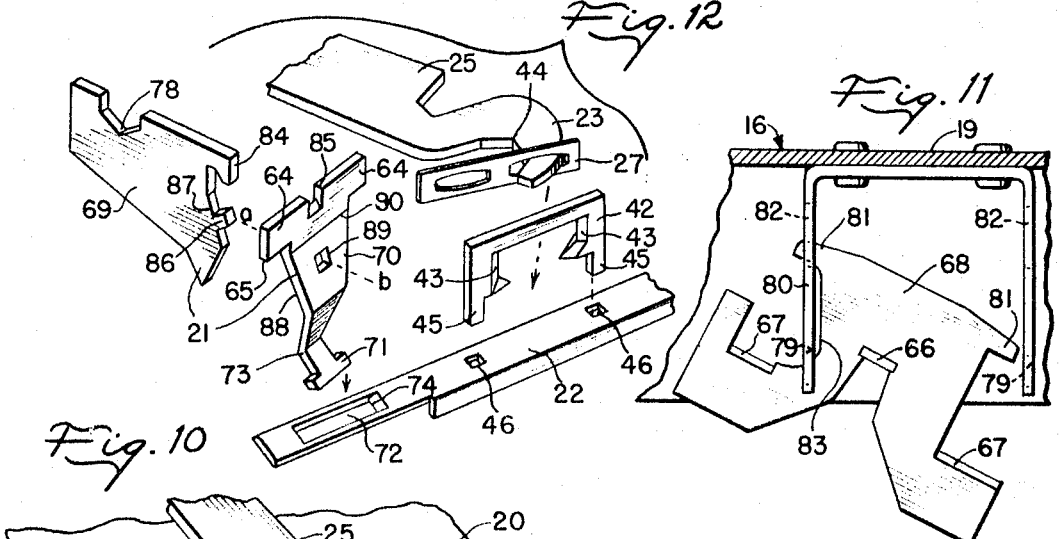
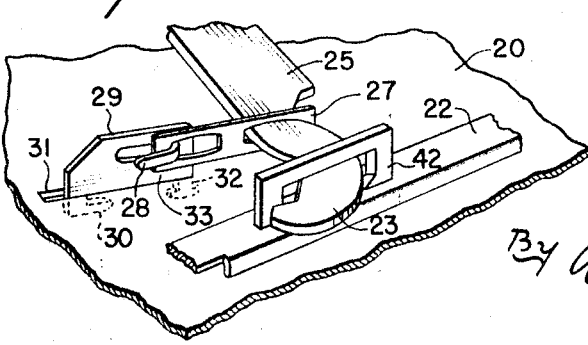
Inventors
MIKE A. PROVI & S. ROBERT GUINTER
By Andrew P. Winterscorn
Attorney Aug. 12, 1969    M. A. PROVI ET AL    3,460,642
LOW PROFILE BATHROOM SCALES
Filed April 28, 1967    6 Sheets-Sheet 4

Inventors
MIKE A. PROVI & S. ROBERT GUINTER
By Andrew N. Wintercorn
Attorney

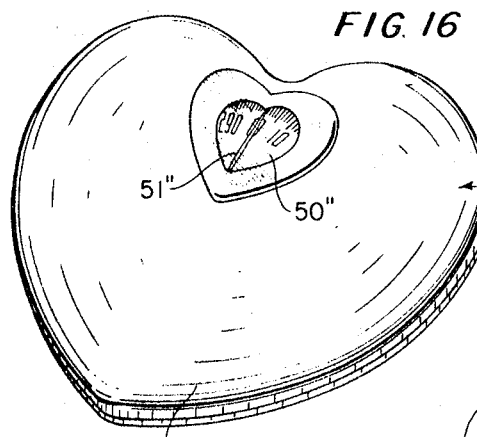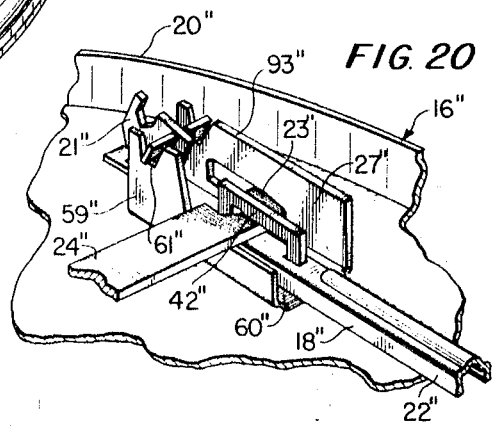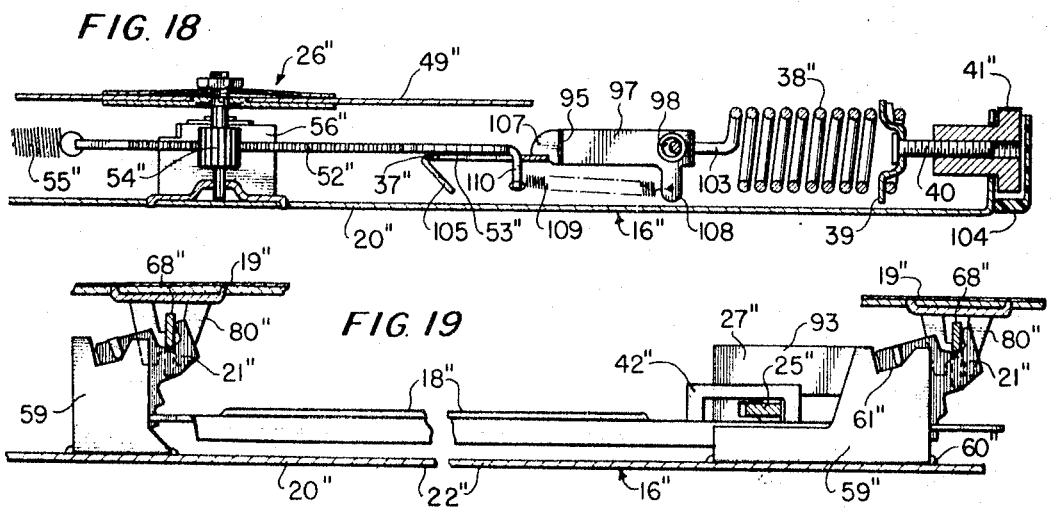

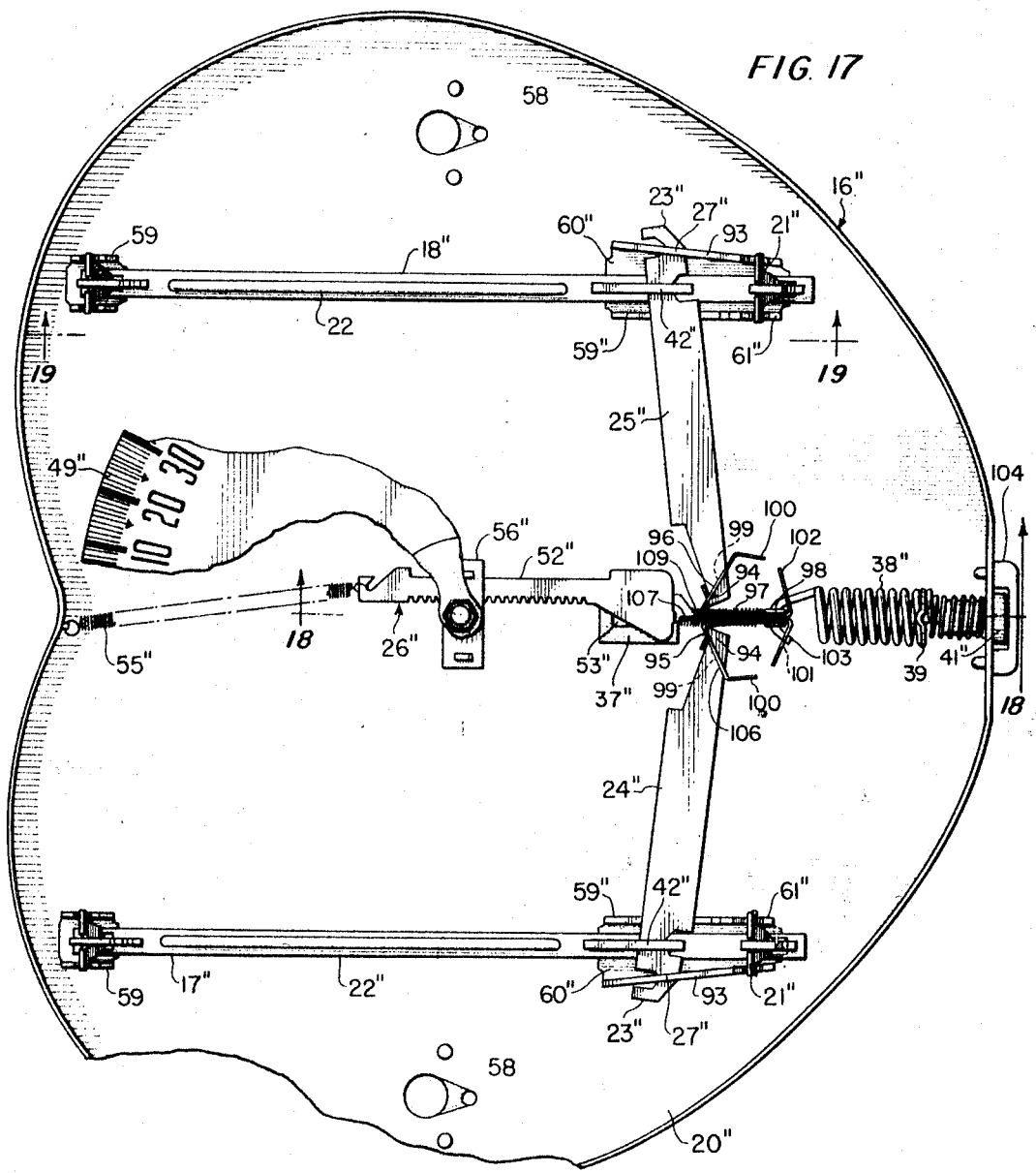

United States Patent Office 3,460,642
Patented Aug. 12, 1969

3,460,642
LOW PROFILE BATHROOM SCALES
Mike A. Provi and S. Robert Guinter, Rockford, Ill., assignors to The Brearley Company, Rockford, Ill., a corporation of Illinois
Continuation-in-part of application Ser. No. 585,078, Oct. 7, 1966. This application Apr. 28, 1967 Ser. No. 641,096
Int. Cl. G01g *21/08*
U.S. Cl. 177—256                                20 Claims

ABSTRACT OF THE DISCLOSURE

Low profile bathroom scales comprising four bell-crank levers fulcrumed on four corners of the base, platform suspended on hangers on the bell-crank levers, pairs of the bell-crank levers connected by a bar for reciprocal actions, two motion multiplying levers, oppositely disposed and each connected to one of said bars connecting the bell-crank levers, said motion-multiplying levers acting in a plane parallel to the platform to produce an indication of weight.

---

This application is a continuation-in-part of our application, Ser. No. 585,078, filed Oct. 7, 1966, now abandoned.

This invention relates to new and improved bathroom scale constructions.

The principal object of this invention is to provide bathroom scales of greatly diminished height—nearly half the height of what was previously considered a "low" scale, the present scales, for example, measuring only 1⅛″ high as against previous scales that measured 1 and ⅞″ to 2″ high, such a radical reduction in height being attainable with this invention by a substantially complete reorganization and rearrangement of the lever mechanism so that whatever parts require any appreciable movement linearly are arranged to have this movement in a substantially horizontal plane between the closely spaced sheet metal base or bottom pan and the sheet metal platform. Thus, four small bell-crank levers of a novel compact design and construction are provided fulcrumed thereon on knife edges to support the platform on these levers at four widely rectilinearly spaced points, two of which are at opposite ends of each of two substantially parallel horizontally disposed bars reciprocable horizontally relative to the base and platform in closely spaced relation to the base to transfer the weight measuring force exerted on the levers by the loaded platform to these bars with a relatively small amount of linear motion given said bars, this small motion being multiplied by two long horizontally disposed levers that are fulcrumed relative to the base and connected with and extend from the bars inwardly toward one another and transmit increased movement horizontally to a member attached on one hand to the readout rack and on the other hand to the weighing spring and disposed horizontally between the base and platform, the linear movement given this member in the stretching of the weighing spring being indicated in any suitable way for a weight reading, as, for example, by the rotation of a dial relative to a pointer.

Due to the heavy loading incident to the reduction in vertical movement of the platform, relative to the base, to the point where there is only approximately ⅛ inch difference in height of the scale unloaded and loaded, an improved form of fulcrum brackets is provided on the base, each having a pair of spaced accurately formed elongated flat bearing surfaces inclined downwardly from a horizontal plane in the bottom of a pair of otherwise generally V-shaped notches provided in each supporting bracket on the base, on which flat bottomed trunnions provided on each bell-crank lever in lieu of knife edges are fulcrumed, these flat bottomed trunnions being crowded to one end of the flat bearing surfaces when weight is applied to the platform so that they fulcrum at their square side edges in the wide angled V defined at the junction between one side of each of the notches and the inclined flat bearing surface as the horizontal bars are placed under load in the stretching of the weighing spring in proportion to the weight applied to the platform. In other words, it is because ordinary knife edges are not adapted for assuming such lateral thrust under such heavy loading, this necessitated redesign and reconstruction of these fulcrums in order to insure longer life and continued close accuracy of weighing. The brackets also have the end in which the motion multiplication levers are fulcrumed rigidly connected with the other end on which the bell-crank levers are fulcrumed, so that there can be no spreading apart of these portions under the heavy loading necessarily imposed with this new design of low scales.

The reorganization and rearrangement of the lever mechanism also necessitated a completely new design and novel construction of bell-crank levers for weight transfer, each consisting of a generally T-shaped main body part in which the cross-bar portion of the T defines the two flat-bottomed trunnions mentioned above, while the vertical leg portion of the T, which has a cross-bar on its lower end for an easy pivotal tie-on connection with one end of one of the horizontal bars by insertion first through a longitudinally extending slot in the bar and then turning the leg at right angles, has a V-bearing formed thereon on one side closely above the cross-bar for fulcrum engagement therein of a transverse knife edge provided on the bar at one end of the slot, the T-shaped main body part supporting on the opposite side thereof from the V-bearing, in a plane at right angles thereto and on its vertical center line, a generally triangular vertical bracket which has a V-notch in the top edge thereof in which to seat the middle knife edge of a conventional generally U-shaped platform supporting hanger disposed transversely of the bracket in spaced substantially parallel relation to the T-shaped main body part of the bell-crank lever. The fastening together of the triangular bracket plate and the T-shaped lever in rigid right angle relationship to one another is accomplished in a novel manner, making these bell-crank lever assemblies available at lower cost but in a better form than would be possible with other constructions costing a lot more.

There is also an unusually compact assembly of these bell-crank levers and horizontal bars in the generally U-shaped brackets provided on the base, the bars extending between and parallel to the arms of these brackets for operation by the T-shaped main body parts of the bell-crank levers straddling the arms of these U-shaped brackets, while the notched brackets on these parts are swingable midway between the sides of said brackets and project forwardly from the brackets sufficiently to provide ample working clearance in front of them for the platform supporting hangers supported on these notched brackets.

The horizontally disposed motion-multiplication levers provided in accordance with this invention may be pivoted relative to the base near their outer ends that are pivotally connected to the bars, but, in a preferred arrangement, each of the two rear brackets mounted on the base provides a fulcrum for the outer end of the associated lever, the horizontal bars having other fulcrums thereon for transmitting thrust to the levers in inwardly spaced relation to the first mentioned ends. Then, depending on which way the motion multiplication levers are arranged to swing and which way the bell-crank levers are mounted, namely, with their hanger supporting brackets projecting forwardly or rearwardly, the weighing spring stretched in the operation of the inwardly projecting levers can be disposed in the front or rear portion of the base on the longitudinal center line thereof, and that, of course, is an important factor from the standpoint of illustrating the adaptability of the present invention to widely different shapes and designs of scales, where in some cases the return to zero adjustment is preferably on the front portion of the scale, whereas in others it is preferably on the rear portion. The motion-multiplication levers, in one arrangement, base their motion transmitting inner end portions in overlapping pivotal engagement at an abutment on a horizontally reciprocable plate carrying the readout rack and connected to the weighing spring to stretch the latter in proportion to the weight applied to the platform. However, an intermediate generally T-shaped member can be provided to connect the inner ends of the motion-multiplication levers to the plate carrying the readout rack for spring restrained lost-motion reciprocation relative to the plate, the inner ends of the levers being fulcrumed to the cross-bar of the T on opposite sides of the leg of the T and retained in slots provided in the generally L-shaped outer ends of the cross-bar. The T-member is made in two generally U-shaped halves of leaf spring material fastened together with an eyelet rivet with the vertically bent end of the aforementioned plate between the two spring parts, the weighing spring having a hook shaped end entered in the eyelet while two oppositely directed arms of the two U-shaped spring parts at the end of the T have slots therein receiving the hook end of the spring to hold the spring against turning so the calibration of the spring is made easier, the hook end of the spring being held in the slots in a plane substantially parallel to the base.

The invention is illustrated in the accompanying drawings, in which:

FIG. 3 is a partial view similar to FIG. 2, but showing the parts as they appear when the platform is under load and the weighing spring is stretched;

FIG. 4 is a section on the line 4—4 of FIG. 3;

FIG. 5 is a partial section similar to FIG. 4, but taken on the line 5—5 of FIG. 2, to illustrate the relationship of the parts when the platform is not under load;

FIG. 6 is a sectional detail on the line 6—6 of FIG. 2, showing the parts on an enlarged scale;

FIG. 7 is a cross-section on the line 7—7 of FIG. 2;

FIG. 8 is a sectional detail on the line 8—8 of FIGS. 2 and 9 showing the parts enlarged to the same extent as in FIG. 6;

FIG. 9 is a cross-section on the 9—9 of FIG. 8;

FIG. 10 is a perspective view of the lower righthand corner of FIG. 2 on a slightly enlarged scale;

FIG. 11 is an illustration of how the hangers, one of which appears in FIG. 9, are adapted to be assembled in the holders provided therefor on the under side of the platform to keep the hangers assembled on the platform when it is removed from the scale and thus facilitate assembly and reassembly of the platform on the base;

FIG. 12 is an exploded view of that much of the scale assembly seen in FIGS. 8 to 10;

FIG. 16 is a perspective view of still another low scale;

FIG. 17 is a plan view of the scale of FIG. 16 with the platform removed and most of the dial broken away to better reveal the structure therebeneath;

FIGS. 18 and 19 are longitudinal sectional details taken on the correspondingly numbered lines of FIG. 17;

FIG. 20 is a perspective view of the structure in the lower right-hand corner of FIG. 17; and FIG. 21 is a slightly enlarged perspective view of the connection between the weighing spring, the readout rack, and the inner ends of the motion multiplication levers as seen in plan view in FIG. 17.

Similar reference numerals are applied to corresponding parts throughout the views.

Figure 1:
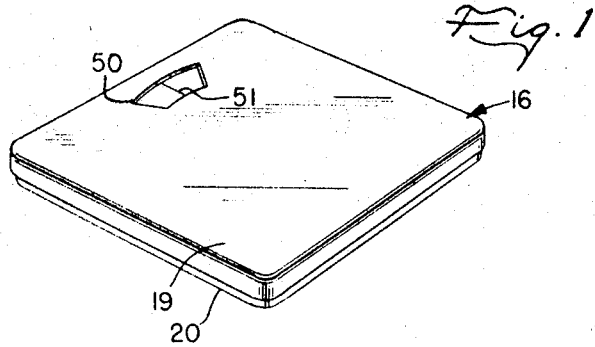
FIG. 1 is a perspective view of a low scale embodying the present invention.
Figure 2:
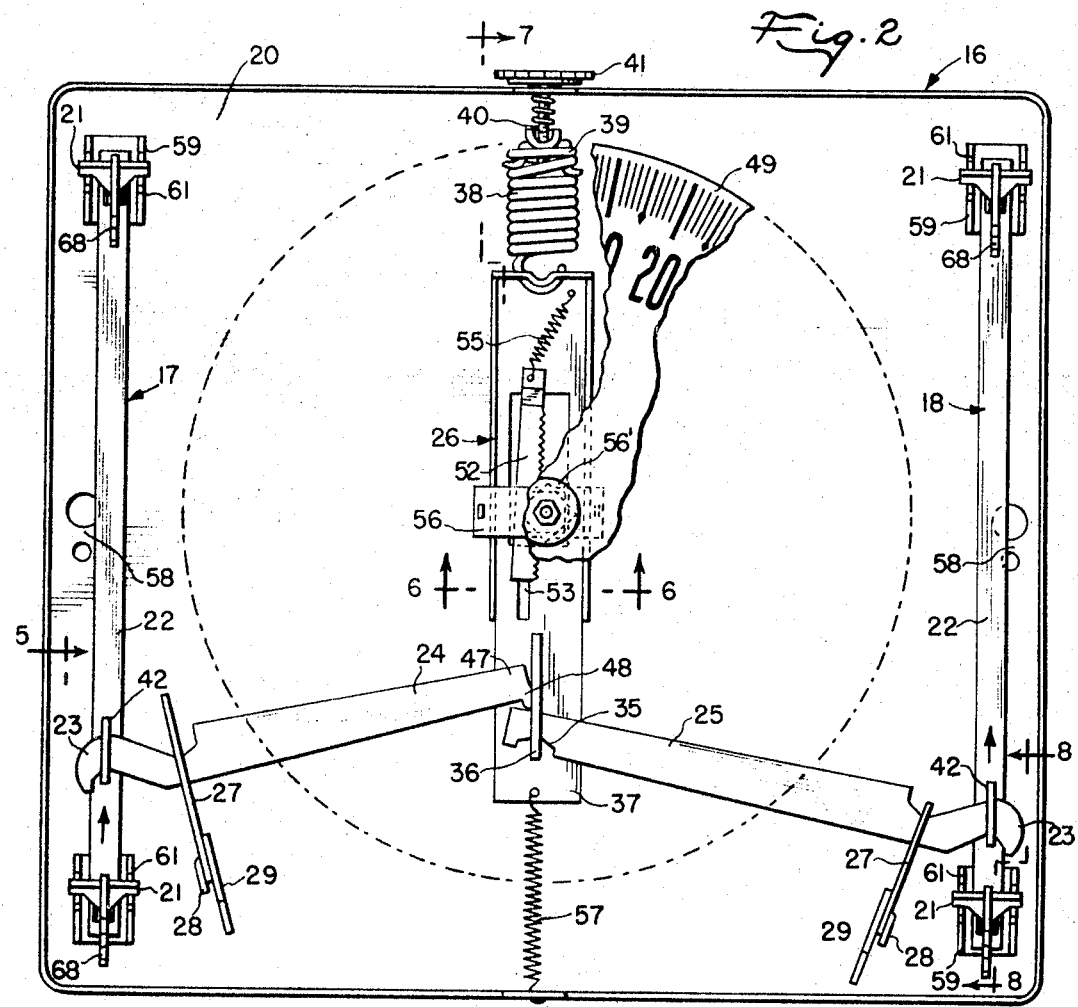
FIG. 2 is a plan view of the scale with the platform removed and most of the dial broken away, so as to reveal the structure therebeneath.

Referring to the drawings, and at first more particularly FIGS. 1 to 12, the reference numeral 16 designates a scale made in accordance with the present invention, this one happening to be illustrated as substantially rectangular in form, although, as will soon appear, the present invention is adaptable to use in circular scales, as at 16′ in FIGS. 12–15, or oval shaped scales, heart-shaped scales, as at 16″ in FIGS. 16–21, and in a wide variety of other designs of bathroom scales; in fact, through a far wider variety than previous bathroom scale constructions, by virtue of the novel complete rearrangement, redesign and reconstruction of the entire lever and weighing mechanism. This mechanism includes the two side lever assemblies, 17 and 18 disposed in spaced substantially parallel relation and designed to have a very small vertical movement in a weighing operation in order to permit its being housed between the platform 19 and its base 20 disposed in the unusually closely spaced relationship shown in FIGS. 4 and 5, where the parts appear substantially full size, the virtual minimum amount of vertical movement given the novel bell-crank levers 21 in the weighing operation causing nearly the same small amount of horizontal movement of intermediate bars 22 reciprocable horizontally in closely spaced relation to the base 20, and that small movement resulting in horizontal oscillation of levers that stretch the weighing spring and operate the weight indicating or readout means through a greater movement. Thus, the outer ends 23 of two inwardly extending motion-multiplication levers 24 and 25 are operable by bars 22 to give the required increased amount of movement to the weight readout mechanism indicated generally by the reference numeral 26 located at the center of the base. The two motion-multiplication levers 24 and 25 are fulcrumed near their outer ends 23 on horizontally disposed hangers 27 that are hooked, as indicated at 28, onto supporting brackets 29 each of which is suitably anchored on the base 20 as by means of a hook 30 on one end entered in a slot 31 in the base and a vertical lug 32 on the other end that is entered in a hole 33 in the base and has its projecting lower end upset to fasten the bracket 29 permanently in place. The inner end 34 of the motion-multiplication lever 25 is notched, as shown at 35, to hook into one end of an elongated yoke 36 mounted in one end of an elongated horizontal plate 37 that has its other end attached to one end of the weighing spring 38 disposed horizontally inside the base 20 with its other end adjustably fixed to a washer 39 that in turn is fixed to one end of a screw 40 threaded in a manually adjustable nut 41 rotatable in a hole provided in the side wall of the base 20. This nut 41 is conveniently arranged with respect to the downwardly projecting flange on the platform 19, as seen in FIG. 7, to permit easy turning of the nut relative to the screw in making the usual "return-to-zero" adjustment of the scale. Yokes 42 of somewhat similar design but much shorter than the yoke 36 are mounted vertically on and near one end of the bars 22, and these have knife edges 43 provided in both ends for fulcrum engagement with the V-notches 44 provided in the outer ends 34 of the motion-multiplication levers 24 and 25. Of course, only one knife edge 43 is employed for each of these two levers in the yokes 42 but, inasmuch as these yokes have reduced lugs 45 which fit in holes 46 provided therefor in the bars 22, as indicated in FIG. 12, the projecting lower ends of the lugs being upset after entry in the holes, the same part 42 can be used with either knife edge 43 engaging in the V-notch 44 in the lever 24 or 25 and there is no need for concern on the assembly line as to which end of the yoke is going to be used for the fulcrum knife edge 43, and, consequently, there is eliminated any likelihood whatsoever of a misassembly. The inner end 47 of the other lever 24 overlaps the inner end 34 of the first mentioned lever 25 inside the yoke 36, as seen in FIGS. 2 and 3, and has a fulcrum projection 48 pivotally engaging the edge of the lever 25, so that the two levers 24 and 25 both transmit thrust to the elongated plate 37 to stretch the weighing spring 38 and accordingly operate the weight readout mechanism 26 to give the proper weight reading. The weight reading is shown on a horizontally disposed dial 49 visible through the window 50 provided in the front end of the platform 19 and readable by the person standing on said platform by reference to the index wire 51 mounted on the under side of the platform 19 and bisecting the window opening 50. The usual lens for magnification of the figures on the dial to facilitate reading, provided in the window opening, is not shown. The dial 49 is operable by means of a rack 52 movable positively in one direction with plate 37 and slidably guided for horizontal reciprocation relative to plate 37 by engagement of a T-shaped lug 52' on one end in a longitudinal slot 53 provided in the plate 37, the rack being urged toward the front end of the slot and laterally against pinion 54 by means of a light tension spring 55 attached to the front end of the rack at one end and to the plate 37 at the other end. This lost-motion at 53 eliminates danger of damage being done to the pinion 54 and rack 52 if a person jumps on the platform, bearing in mind that the dial 49 is fixed as at 56' to the pinion 54 and when it is given rotation in one direction, the momentum is enough to cause serious damage to the intermeshing gear teeth of the rack and pinion if the direction of rotation is suddenly reversed. The pinion 54 is suitably mounted for rotation on a vertical axis in a frame 56 that is secured to the base 20 and serves as a guide for the plate 37 in its reciprocation in each weighing operation. Another light tension spring 57 is stretched on an inclined line between the rear end of the plate 37 and the back wall of the base 20 and serves to support the rear end of said plate off the base during a weighing operation, so that there will be no frictional drag imposed on the operation of the weight indicating means that could result in errors in the readings. The usual tension springs for holding the platform 19 in assembled relation to the base 20 are not shown but are provided at opposite sides of the scale on vertical lines between the base and platform, the places for hooking the lower ends of such springs to the base 20 under tension being indicated at 58.

Figure 15:
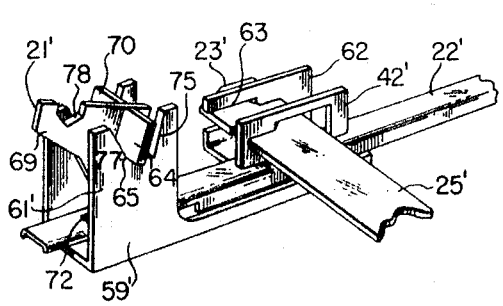
FIG. 15 is a perspective view of the lower righthand corner of FIG. 14.
Figure 13:
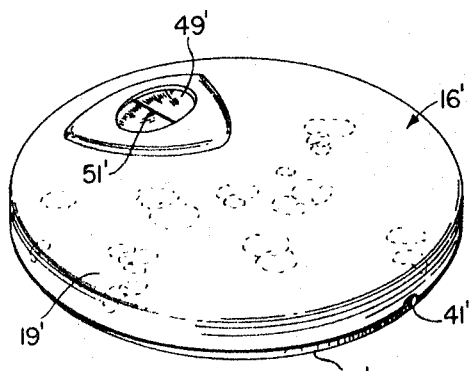
FIG. 13 is a perspective view of still another low scale.
Figure 14:
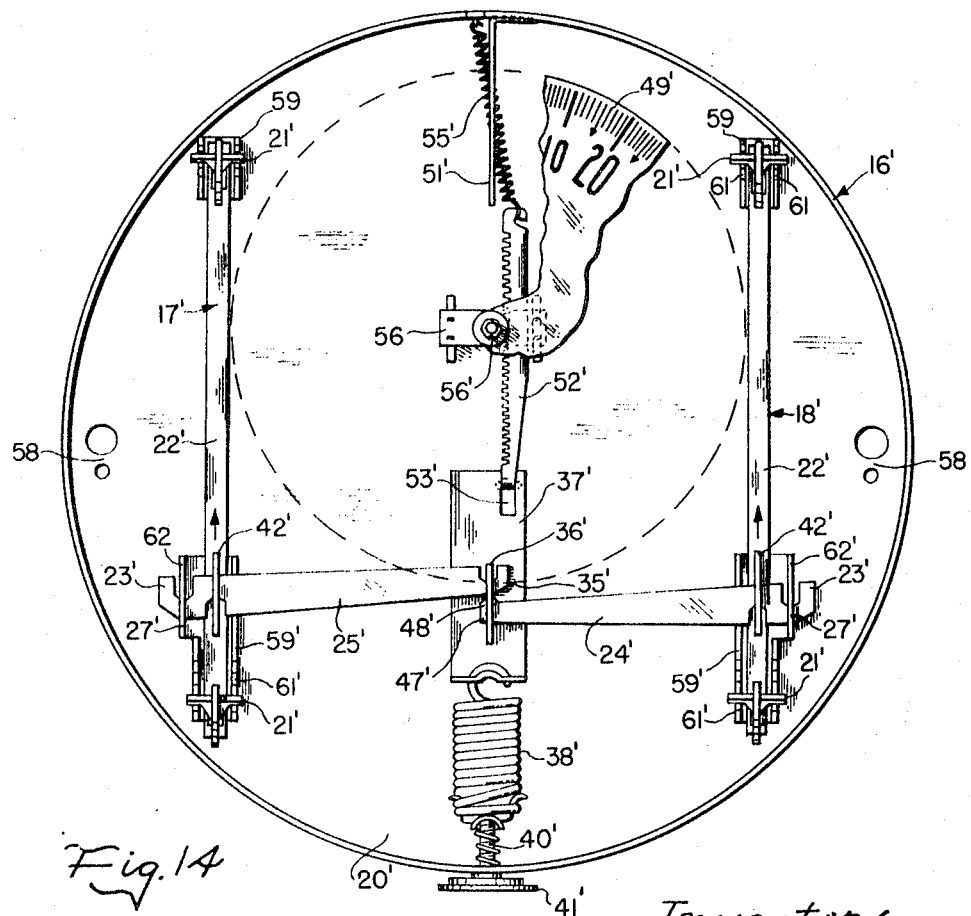
FIG. 14 is a plan view of the scale of FIG. 13 with the platform removed and most of the dial broken away to reveal the structure therebeneath.

Referring to FIGS. 13 to 15, wherein the scale 16' illustrated is a low scale of circular form, as previously indicated, the lever and weighing mechanism employed here is generally similar to that shown in FIGS. 1 to 12, but, whereas the motion-multiplication levers 24 and 25 of FIGS. 1 to 12 are of the first kind with their fulcrums 27 intermediate their ends and the weight applied at their outer ends, here the motion-multiplication levers 24' and 25' are of the second kind with their fulcrums 27' at their outer ends 23' while the weight is applied as at 42' intermediate their ends, the principal object in the rearrangement being to simplify and economize by incorporating the fulcrums 27' as integral parts of channel shaped sheet metal brackets 59' that are suitably secured by their web portions as at 60 to the base 20' and provide bell-crank lever supports at one end as at 61' while providing an upwardly projecting flange on one side at the other end as at 62 slotted longitudinally from one end as at 63 for fulcrum engagement with the outer end 23' of the levers 24' and 25'. The latter have rearward thrust applied thereto by the yokes 42' on the bars 22' when a person stands on the platform 19', and the small amount of movement given the levers in the weighing operation is multiplied similarly as in FIGS. 1 to 12 by levers 24' and 25', and they cause the weighing spring 38' that is disposed horizontally in the middle rear portion of the base 20' as seen in FIG. 14, to be stretched as the levers 24' and 25' jointly apply pressure to the yoke 36' carried on the plate 37' attached to the front end of the weighing spring. The dial 49' has its pinion (not shown) turned by the readout rack 52' as it is allowed to move forward with the plate 37' under the action of its tension spring 55', so as to indicate the weight of the person standing on the platform, the weight being indicated by the index wire 51' shown here as mounted on the base and projecting over the top of the dial at the zero position. The desired amount of lost-motion is provided by the slot 53' and the T-connection of rack 52' with plate 37' for protection of the rack and the pinion operating the dial in the event a person jumps on the scale. The same return to zero adjustment is obtained with the manually adjustable nut 41' threading on the screw 40', as in the other form. It should be clear, therefore, that with this mechanism the two side lever assemblies 17' and 18' afford all of the advantages of the two side lever assemblies 17 and 18, previously described, with the further advantage that there is greater compactness and greater economy of construction and assembly by virtue of the novel way in which the motion-multiplication levers 24' and 25' fulcrum directly on the bracket parts 61' of these assemblies, instead of on separate fulcrums 27 separately mounted on the base. There is still another advantage derived with this novel construction, and that is by reversing the bell-crank levers 21' to pull rearwardly on bars 22', instead of forwardly, as they are shown in FIG. 14, and at the same time reversing the motion-multiplication levers 24' and 25' to swing rearwardly instead of forwardly, as shown in FIG. 14, the weighing spring 38' can be located at the front of the base 20', opposite from the location of the weighing spring 38 in base 20 of FIGS. 1 to 12 and, nevertheless, the same mode of operation can be used for the dial 49' by rack and pinion means operating, like rack 52 and pinion 54 in FIGS. 1 to 12.

Referring next to FIGS. 8 to 12, in which the improved form of fulcrum brackets 59 is illustrated (and, of course, the same construction is involved in the brackets 59 and 59' of FIGS. 13–15, and 59 and 59" of FIGS. 16–21 in which the bell-crank levers 21' and 21", respectively, are carried is concerned) it will first of all be noticed that trunnions 64 provided on each of the bell-crank levers 21 (and 21' and 21") are flat on the bottom, as indicated at 65, instead of the usual knife-edge shape like those shown at 66 and 67, for example, on the hangers 68 that are provided under the four corners of the platform 19 to transmit the load of the loaded platform onto the four bell-crank levers 21 (or 21' and 21") through the intermediary of the generally triangular vertical brackets 69 rigid with the generally T-shaped main body portion 70 and on its vertical center line so that the bell-crank lever 21 (or 21' and 21") fulcruming at 65 on the bracket 59 (or 59' and 59") will under load applied on the platform oscillate through a small angle and transfer the load in a horizontal direction to the horizontal bar 22 (or 22' and 22") inasmuch as the cross-bar 71 on the lower end of the T-shaped body parts 70 extends through a slot 72 in the bar 22 and has fulcrum engagement at its V-shaped portion 73 on the leg of T-shaped part 70 on the knife edge 74 provided in one end of the slot 72. It is due to the fact that, with this novel construction, when load is applied to the bell-crank lever 21 (or 21' and 21"), the trunnions 64 are forced to one side of the generally V-shaped notch 75 provided in the bracket 59 (or 59' and 59") that the inclined flat bottoms 76 are required in the lower ends of these notches 75, so that the square side edges on the flat bottoms 65 of trunnions 64 may fulcrum in the wide angle V 77 defined at the junction between one side of each of these notches and the inclined flat bearing surface 76 provided at the bottom of the notch. The interengaging parts are, of course, hardened, and, with this novel form of fulcrum indicated at 65–77 in FIG. 8, much longer life of the scale structure is definitely assured. Ordinary knife edges would not be adapted for assuming the lateral thrust, and this accordingly necessitated redesign and reconstruction of the fulcrums in order to insure longer life and continued accuracy of weighing. In passing, it will be seen that the middle knife edge 66 on each of the hangers 68 fulcrums in the V-shaped notch 78 provided in the outer end of the bracket 69, while the two other upwardly facing knife edges 67 find similar fulcrum support in the V-shaped notches 79 provided in the lower ends of the two arms of the inverted U-shaped bracket 80 carried on the under side of the platform 19. The hangers 68, as seen in FIG. 11, are slightly wider across the top than the inverted U-shaped brackets 80 where the lugs 81 on opposite ends project through keystone-shaped holes 82 provided in the two arms of the U near upper ends, and the hanger 68 is cut away, as indicated at 83 in FIG. 11, on one side to provide sufficient clearance to enter one of the projections 81 in one of the holes 82, after which it is a simple matter, by springing apart the legs of the inverted U-shaped bracket 80, to get the other end 81 entered in the other hole 82. Then the weight of the platform is, of course, transmitted through the notched lower end 79 of the two legs of the bracket 80 through the hanger 68 to the bell-crank 21 and then to the bar 22, the projections 81 serving only to keep the hangers 68 in assembled relationship to the platform 19 by means of the bracket 80.

The novel two-piece construction of the bell-crank levers 21 and 21' is best shown in FIGS. 8, 9 and 12, the latter figure showing the two parts 69 and 70 thereof in exploded relationship to best show the hook projection 84 on the inner upper end of bracket plate 69 arranged to engage downwardly fairly closely in a notch 85 provided in the top of the T-shaped lever 70 on the vertical center line, for what is eventually one-half of the rigid connection between the two parts, the other half of the eventual rigid connection between said parts being provided partly by a substantially square lug 86 provided in right angle relationship to and between the ends of the upper half of the generally V-shaped rear edge 87 of the bracket plate 69 that matches the abutting side of the zigzag or V-bent middle portion 88 of the leg of the T-shaped lever 70, so that this lug 86 is upwardly inclined on a line in converging relationship to the substantially horizontal line of the aforementioned hook projection 84 to insure maximum rigidity when the lug 86 is entered in a novel manner in a square hole 89 that is provided in the part 70 horizontally aligned with the lug, as indicated by dotted line a–b in FIG. 12. The novel method of assembly is as follows: When the two stamped sheet metal parts 69 and 70 are to be assembled together, they are placed in between two specially made dies, whereby the more or less open hook 84 is started in notch 85 at the same time that lug 86 is started in hole 89, and, as the crimp 90 is made in lever 70 transversely of the upper end, between the hole 89 and the trunnions 64 and on a line parallel to the latter, the open hook 84 is entered fully in notch 85 at the same time as lug 86 is entered all the way in hole 89, and then, at the end of this novel assembling operation and before the assembly is removed from between the dies, the protruding end of the lug 86 is upset, as seen at 91 in FIG. 8, and the hook 84, which would otherwise still be a bit open and therefore tend to be loose, is swedged to closed or clinched condition tightly against the outer side of the lever 70, as seen at 92 in FIG. 8. The completed bell-crank assembly is later heat-treated to give the desired hardness on the trunnions 64 and fulcrum bearing surfaces 73 and 78.

Referring now to FIGS. 16 through 21, wherein many of the parts that correspond to parts of the two other scales 16 and 16' have been numbered with double prime numbers, there is a closer similarity in the heart-shaped scale 16'' to the circular scale 16' because of the fact that the motion-multiplication levers 24'' and 25'' have their outer ends 23'' fulcrumed on the brackets 59'' and are fulcrumed near their outer ends in yokes 42'' that are fixed on the bars 22'' to transmit rearward thrust to the levers 24'' and 25'' for a weighing operation when a person stands on the platform 19''.

The principal differences in relation to scale 16' in scale 16'' are:

(1) The improved design of brackets 59'' over brackets 59' by cross-connecting, as at 93, the opposite ends of the brackets on that side where the levers 24'' and 25'' are fulcrumed, whereby to brace these brackets against distortion under the heavy loading necessarily imposed with the present new design of low scales;

(2) The motion-multiplication levers 24'' and 25'', instead of being overlapped at their inner ends and accordingly made slightly different like levers 24' and 25', are made identical (and hence interchangeable) with hook-shaped inned ends 94 fulcrumed in V-shaped pockets 95 defined in the two halves of the cross-portion of a generally T-shaped intermediate unit or member 96, the leg 97 of which has the inner end of the weighing spring 38'' hooked therein in an eyelet 98, thereby insuring exactly the same forward thrust from the two levers 24'' and 25'' in stretching the weighing spring 38'' in a weighing operation, for closer accuracy of readout, and (3) Improvement in the construction of the intermediate generally T-shaped unit or member 95 so that it not only supports the inner ends of the lever 24'' and 25'' in substantially coplanar horizontal relationship by the provision of elongated slots 99 in the hook-shaped outer end portions 100 of the cross-bar of the T, the T-shaped member 95 also having horizontal slots 101 provided in lateral extensions 102 on opposite sides of the end of the leg of the T in which the hook-shaped end 103 of the weighing spring 38'' is received to hold the spring against turning when the manually adjustable nut 41'' used for making the "return-to-zero" adjustment is adjusted, this nut having its knurled head outside the base, preferably enclosed for protection against unauthorized adjustment by a removable plastic cover 104, while its reduced cylindrical shank portion threads on a screw 40 suitably fixed to a washer 39 rotatably adjustably fixed in one end of the spring 38'' at the factory when the spring is calibrated (the spring resting on the base 20'' to support one end of the assembly when there is no load on the platform, while the other end of the assembly is supported on the base by downwardly bent lugs 105 provided on the front end of the plate 37'').

The generally T-shaped intermediate unit or member 95 is made up of two interchangeable generally U-shaped bent leaf spring members 106 disposed in opposed relationship with their cross-portions in parallel relation and with the twisted elongated end portion 107 of the plate 37'' disposed betwen the cross-portions of these U-shaped elements, the three parts being riveted together by the eyelet 98, into which the hooked end 103 of the weighing spring is entered so as to connect the spring with the plate 37'' while the twisted end portion 107 of the plate provides support on its opposite sides for the two opposed U-shaped spring elements 106, in which the inner ends of the motion-multiplication levers 24'' and 25'' are fulcrumed and held in coplanar relationship to one another. There is a downwardly projecting lug 108 on the extremity of the end portion 107 of plate 37'' and to this is attached one end of a coiled tension spring 109, the other end of which is attached to a downwardly bent lug 110 on the adjacent end of the readout rack 52'' which is slidably received in the longitudinal slot 53'' provided in the plate 37''. Spring 109 is stronger than spring 55″ and hence maintains the lug 110 at the inner end of the slot 53″ so that, in a weighing operation, the rack 52″ is given positive movement to turn the dial 49″ through pinion 54″ in direct proportion to the stretching of spring 38″. However, in the event a person jumps on the platform, the lost-motion at 53″ eliminates danger of any damage being done to the pinion 54″, as previously described. Of course, when the scale is in normal use the assembly just described involving intermediate member 95 is raised clear of the base 20″ as the parts appear in FIG. 18, the weighing spring 38″ being then more or less extended, depending, of course, upon the amount of weight applied to the platform.

It is believed the foregoing description conveys a good understanding of the objects and advantages of my invention.

I claim:

1. In a weighing scale, a horizontal weight indicator mounted for rotation relative to a horizontal base therebeneath and below a horizontal platform in which an opening is provided through which the indicator is visible, four bell-crank levers oscillatably mounted on the base at the four corners of an approximate rectangle, means supporting the platform on said bell-crank levers to transmit oscillatory movement thereto, two bars reciprocable horizontally over said base along opposite sides of said rectangle, each bar interconnecting two of said bell-crank levers and reciprocable in the oscillation thereof, a pair of opposed horizontal motion-multiplication levers connected to and extending from the respective bars inwardly toward one another and oscillatable relative to said base in response to the movement given said bars by said levers when the platform is loaded, means for resisting oscillation of said pair of levers and movable relative to said base, and means for operating said indicator in response to the movement of said pair of levers and said last mentioned means.

2. A weighing scale as set forth in claim 1 wherein said motion-multiplication levers are levers of the first kind pivoted relative to said base near their outer ends and operatively connected to said bars at their outer ends, their inner ends giving increased movement to the two last mentioned means.

3. A weighing scale as set forth in claim 1 including four brackets on said base on which the four bell-crank levers are fulcrumed, two of said brackets under one-half portion of said platform having the outer ends of said motion-multiplication levers fulcrumed thereon, and said levers being operatively connected to the two bars near their outer ends.

4. A weighing scale as set forth in claim 1 including four brackets on said base on which the four bell-crank levers are fulcrumed, two of said brackets under one-half portion of said platform having the outer ends of said motion-multiplication levers fulcrumed thereon, and said levers being operatively connected to the two bars near their outer ends, said two brackets being of channel form, each providing a pair of spaced parallel side walls between which the bell-crank lever is disposed and on which trunnions provided on the bell-crank lever are fulcrumed, the outer side walls of the two brackets remote with respect to one another each also providing a fulcrum for the outer end of one of said motion-multiplication levers in longitudinally spaced relation to the bell-crank lever fulcrums.

5. A weighing scale as set forth in claim 1 including four brackets on said base on which the four bell-crank levers are fulcrumed, two of said brackets under one-half portion of said platform having the outer ends of said motion-multiplication levers fulcrumed thereon, and said levers being operatively connected to the two bars near their outer ends, said two brackets being of channel form, each providing a pair of spaced parallel side walls between which the bell-crank lever is disposed and on which trunnions provided on the bell-crank lever are fulcrumed, the outer side walls of the two brackets remote with respect to one another each also providing a fulcrum for the outer end of one of said motion-multiplication levers in longitudinally spaced relation to the bell-crank lever fulcrums, there being on each of said brackets a rigid substantially horizontal connection over the motion-multiplication lever between the fulcrum for the latter and one of the fulcrums for the bell-crank lever to maintain a fixed spaced relationship therebetween regardless of heavy loading imposed on the brackets in the operation of the scale, whereby to prevent bracket distortion and consequent error in weight readout.

6. A weighing scale as set forth in claim 1 including four brackets on said base on which the four bell-crank levers are fulcrumed, two of said brackets under one-half portion of said platform having the outer ends of said motion-multiplication levers fulcrumed thereon, and said levers being operatively connected to the two bars near their outer ends, said two brackets being of channel form, each providing a pair of spaced parallel side walls between which the bell-crank lever is disposed and on which trunnions provided on the bell-crank lever are fulcrumed, the outer side walls of the two brackets remote with respect to one another each also providing a fulcrum for the outer end of one of said motion-multiplication levers in longitudinally spaced relation to the bell-crank lever fulcrums, the outer side wall of the channel of each of said brackets having a longitudinally extending slot provided therein, at one end of which remote from the fulcrums for the bell-crank lever is provided a fulcrum for the outer end of the motion-multiplication lever, whereby the fulcrums for said motion-multiplication levers and the fulcrums for said bell-crank levers are rigidly interconnected by said slotted side walls to withstand the strain imposed in the heavy loading of said brackets in the operation of the scale and prevent distortion and consequent error in weight readout.

7. A weighing scale as set forth in claim 1 wherein said motion-multiplication levers are levers of the second kind pivoted relative to said base at their outer ends and operatively connected to said bars near their outer ends, their inner ends giving increased movement to the two last mentioned means.

8. A weighing scale as set forth in claim 7 including two brackets on said base on which two of said bell-crank levers are fulcrumed, said brackets providing thereon fulcrum support for the outer ends of said motion-multiplication levers.

9. A weighing scale as set forth in claim 1 including four brackets on said base on which the four bell-crank levers are fulcrumed, said brackets being all of channel form, each providing a pair of spaced parallel side walls between which the bell-crank lever is disposed and on which trunnions provided on the bell-crank lever are fulcrumed, said two bars being each disposed with their opposite ends between said side walls on two of said brackets and pivotally connected at opposite ends to the lower ends of two of said bell-crank levers fulcrumed thereon, each of the latter having a bracket rigid therewith projecting from the channel bracket and carrying the platform thereon.

10. A weighing scale as set forth in claim 9 wherein the outer end portions of said motion-multiplication levers extend in transverse relationship to said bars and have fulcrum engagement thereon near their outer ends, the outer ends of said levers being fulcrumed on two of said channel brackets.

11. A weighing scale as set forth in claim 9 wherein the outer end portions of said motion-multiplication levers are fulcrumed on said bars and are pivoted near their outer ends on said base.

12. A weighing scale as set forth in claim 9 wherein the trunnions on said bell-crank lever are of substantially rectangular form and flat on the bottom so as to provide substantially right angle fulcrum edges, said brackets having generally V-shaped notches provided therein wider than said trunnions and with inclined flat bottoms up which said trunnions are slidable to one end in the weighing operation, said notches defining wide angled fulcrums at the high end of said inclines for fulcruming of the right angle edges of said trunnions thereon.

13. A weighing scale as set forth in claim 1 wherein two motion-multiplication levers have their inner ends disposed in substantially coplanar relation and jointly transmitting thrust in a weighing operation to the means resisting oscillation of said levers.

14. A weighing scale as set forth in claim 13 wherein the means resisting oscillation of said levers includes a substantially horizontal plate reciprocable relative to said base and attached to one end of a horizontally disposed weighing tension spring attached at its other end to said base, said plate having the inner ends of said levers fulcrumed relative thereto while maintained thereby in substantially coplanar relation.

15. A weighing scale as set forth in claim 14 wherein the means for operating the weight indicator comprises a rack operating a pinion connected to said indicator, said rack having a lost-motion sliding connection at its one end with said plate in the direction of its reciprocation and having spring means connected to the other end urging it resiliently to one end of said lost motion.

16. A weighing scale as set forth in claim 1 wherein the means for resisting oscillation of said pair of motion-multiplication levers comprises a coiled tension spring horizontally disposed over and anchored at one end to said base, and the means for operating the indicator in response to movement of the pair of motion-multiplication levers comprises a rack movable horizontally over said base and operating a pinion connecting with the weight indicator, there being a member disposed horizontally between the inner ends of said motion-multiplication levers having these inner ends fulcrumed relative to opposite sides thereof in coplanar relationship to one another, the other end of said tension spring being connected to said member so that the spring resists oscillation of said levers, said member being operatively connected with said rack to transmit reciprocatory movement thereto to operate the indicator in proportion to stretching of said spring.

17. A weighing scale as set forth in claim 16 wherein the rack has a lost-motion connection with said member, there being spring means connected with said rack for taking up the lost-motion, said spring means being yieldable to permit reciprocatory movement of said rack independently of said member to prevent damage to the scale in the event the platform is suddenly loaded and unloaded.

18. A weighing scale as set forth in claim 16 including a manually operable screw adjustment at the anchored end of said spring operable by turning a knob relative to said base, the member having a hook provided on the other end of said spring so connected with said member to hold said spring against turning so as to permit making said screw adjustment in either direction relative to said spring for a return-to-zero adjustment of said scale.

19. A weighing scale as set forth in claim 16 wherein said member is generally T-shaped and made up of two generally U-shaped side parts disposed horizontally with their cross-portions in opposed relationship to one another on opposite sides of an elongated intermediate horizontal middle part, the two U-shaped side parts being fastened by their cross-portions to one end of the elongated middle part and having a hook on the adjacent end of the coiled spring connected thereto, the one arm on each U-shaped side part having a horizontal slot provided therein, and the two slots being horizontally aligned to receive therein the hook end of the spring to hold it against turning, the other arms of the U-shaped side parts being formed to define fulcrums for the inner ends of the motion-multiplication levers and also having horizontal slots provided therein to receive and support the inner ends of said levers in horizontal alignment, the rack extending from and reciprocable with said middle part.

20. A weighing scale as set forth in claim 19 wherein the rack has a lost-motion connection with said middle part, there being spring means connected with said rack for taking up the lost-motion but yieldable to permit reciprocatory movement of said rack independently of said middle part to prevent damage to the scale in the event the platform is suddenly loaded and unloaded.

References Cited
UNITED STATES PATENTS 3,358,785    12/1967    Mayer et al. _____ 177—256

RICHARD B. WILKINSON, Primary Examiner

GEORGE H. MILLER, Assistant Examiner